United States Patent
Younsi et al.

(10) Patent No.: US 8,051,712 B2
(45) Date of Patent: Nov. 8, 2011

(54) ELECTRONIC STATOR END WINDING ACCELEROMETER SENSOR

(75) Inventors: Karim Younsi, Ballston Lake, NY (US); Raymond Verle Jensen, Gardnerville, NV (US); Brian Burket Bowlds, Minden, NV (US); Han Bao Tran, Gardnerville, NV (US); Mitchell D. Cohen, Carson City, NV (US); Ryan G. Roaldson, Minden, NV (US); Richard William Whipple, Minden, NV (US)

(73) Assignee: General Electric Company, Schenectady, NY (US)

( * ) Notice: Subject to any disclaimer, the term of this patent is extended or adjusted under 35 U.S.C. 154(b) by 464 days.

(21) Appl. No.: 12/251,720

(22) Filed: Oct. 15, 2008

(65) Prior Publication Data
US 2010/0089159 A1    Apr. 15, 2010

(51) Int. Cl.
*G01P 1/02* (2006.01)
*G01H 11/06* (2006.01)
*G01D 21/00* (2006.01)

(52) U.S. Cl. ............ 73/493; 73/661; 73/866.5
(58) Field of Classification Search ............ 73/493, 73/514.32, 649, 654, 660, 661, 431, 866.5
See application file for complete search history.

(56) References Cited

U.S. PATENT DOCUMENTS

| | | | | |
|---|---|---|---|---|
| 3,629,773 A * | 12/1971 | Shoor | .............. | 338/43 |
| 4,823,602 A * | 4/1989 | Christensen, Jr. | .............. | 73/661 |
| 4,858,470 A * | 8/1989 | Kincaid et al. | .............. | 73/654 |
| 4,905,518 A * | 3/1990 | Kubler | .............. | 73/654 |
| 4,947,690 A * | 8/1990 | Cleveland | .............. | 73/654 |
| 5,029,474 A * | 7/1991 | Schulze | .............. | 73/587 |
| 5,473,941 A * | 12/1995 | Judd et al. | .............. | 73/514.34 |
| 5,477,735 A * | 12/1995 | Li | .............. | 73/654 |
| 5,796,006 A * | 8/1998 | Bellet et al. | .............. | 73/661 |
| 6,205,872 B1 * | 3/2001 | Pflueg | .............. | 73/866.5 |
| 6,435,902 B1 * | 8/2002 | Groh et al. | .............. | 439/527 |
| 6,533,494 B1 * | 3/2003 | Gordon | .............. | 403/306 |
| 7,134,334 B2 * | 11/2006 | Schirmer et al. | .............. | 73/493 |

* cited by examiner

*Primary Examiner* — Helen C. Kwok
(74) *Attorney, Agent, or Firm* — Pearne & Gordon LLP

(57) ABSTRACT

An insulated accelerometer assembly is provided for attachment to a vibrated component. A base has a portion for engagement and connection with the vibrated component and to transmit vibration. An accelerometer senses vibration and is located at least partially within the base. A housing at least partially encloses the accelerometer and inhibits voltage discharge, corona damage, and voltage tracking on the accelerometer. The housing is made of an insulating material and has an interior for the accelerometer. The housing has a plurality of raised fins on the exterior. A mounting cap also inhibits voltage discharge, corona damage, and voltage tracking and secures the housing. The mounting cap is made of insulating material and has an exterior that includes a plurality of raised fins. A cable has an electrically conductive wire and has a shield to inhibit electrical noise.

13 Claims, 2 Drawing Sheets

ELECTRONIC STATOR END WINDING ACCELEROMETER SENSOR

FIELD OF THE INVENTION

The present invention relates generally to accelerometer assemblies, and more particularly, to accelerometer assemblies that reduce the effects of voltage discharge, corona damage, and voltage tracking.

BACKGROUND OF THE INVENTION

Accelerometers are well-known and are usable to detect motion. Accelerometers output signals indicative of the force/motion and are operatively connected to components for receipt of the signals. In one specific example, accelerometers measure acceleration and/or reactionary forces in a vibrating system. Accelerometer use environments that also have high voltage may induce errors in signals proceeding along electrically conductive accelerometer connections. Fiber optic accelerometer connections do not have such issues of induced signal errors. Thus, it is known to provide a fiber optic accelerometer in a high voltage environment. However, fiber optic accelerometer connections can be costly.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, an insulated accelerometer assembly is provided for attachment to a vibrated component. The assembly has a base having a portion for engagement with the vibrated component to connect the assembly to the vibrated component and to transmit vibration from the vibrated component to the assembly. An accelerometer is provided to sense vibration and is located at least partially within the base. A housing at least partially encloses the accelerometer and inhibits voltage discharge, corona damage, and voltage tracking on the accelerometer. The housing is made of an insulating material and has an interior with the accelerometer being located within the interior. The housing has a plurality of raised fins on the exterior. A mounting cap is also provided to inhibit voltage discharge, corona damage, and voltage tracking on the accelerometer and to secure the housing relative to the base. The mounting cap is made of insulating material and has an exterior that includes a plurality of raised fins. A portion of the mounting cap is engaged with the base. A cable having at least one electrically conductive wire has a shield to inhibit influence on the wire. The wire is operatively connected to the accelerometer and extends within the shield.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
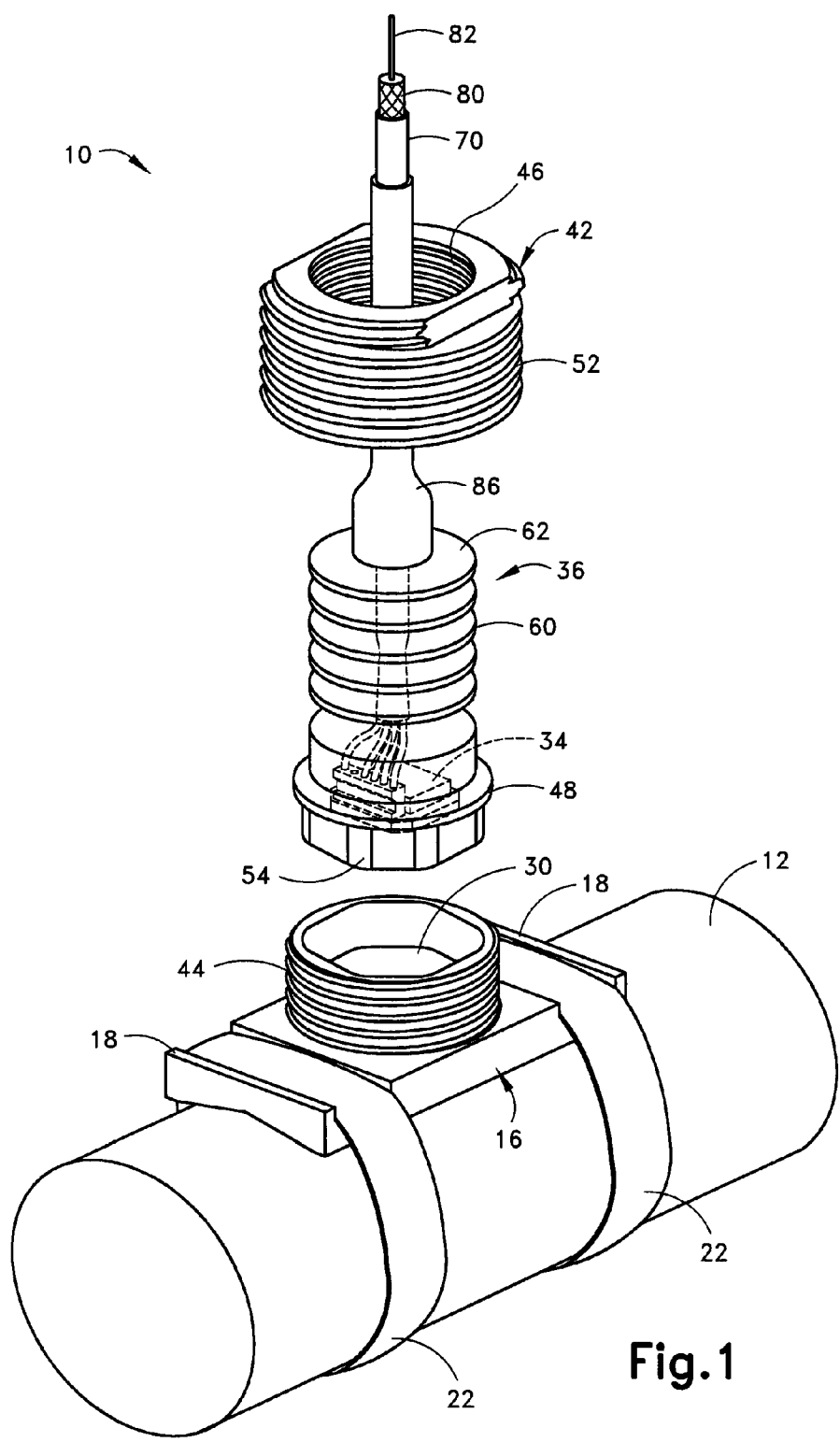
FIG. 1 illustrates an exploded, perspective view of an example insulated accelerometer assembly coupled to an example vibrated component.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to FIG. 1, an example of an insulated accelerometer assembly 10 adapted for attachment to a vibrated component 12 is shown in accordance with example aspects of the subject invention. In one example, the vibrated component 12 may be a stator end winding, such as present in electricity generators or the like. In other examples, the vibrated component 12 may be a rotor winding or other various high voltage elements subject to high vibration. Of course, the vibrated component 12 may vary. Often, the environment of the vibrated component 12 is subjected to large influences from high voltage disturbance. Such influence may be caused by the vibrated component 12 or by another proximate component. For ease of description of an example, it may be considered that the area of the vibrated component 12 can be subjected to such disturbance influence. Also, vibration is just a single example of force/motion influence that is applied to the component 12. Such force/motion may be caused by the component 12 itself or may be caused by another proximate component. For ease of description of an example, the component is merely referred to as being vibrated.

In the shown example, the assembly 10 includes a mounting base 16 directly or indirectly coupled to the vibrated component 12. The base 16 is adapted to engage the vibrated component 12 to allow the vibrated component 12 to transmit vibration from the vibrated component 12 to the assembly 10. The base 16 can be removably or non-removably coupled to the vibrated component 12 via various means. In one example, a pair of shoulders 18 is provided on the sides of the base 16 to assist in securing the base 16 to the vibrated component 12. Each shoulder 18 has a recessed portion 20 (best seen in FIG. 2). A roving material 22 (FIG. 1), or the like, may be wrapped at least partially around the vibrated component 12 and each shoulder 18 at the recessed portion 20 for coupling the assembly 10 to the vibrated component 12. In addition or in the alternative, an adhesive, such as epoxy or the like, can adhere the base 16 to the vibrated component. In another alternative, the base 16 may be coupled to the vibrated component 12 by straps, fasteners, or the like.

A recessed portion 30 is provided in the base 16 for at least partially accommodating an accelerometer 34 and at least partially receiving a probe housing 36. The base 16 may include an electrically insulating material, such as glass filled plastic. An insulating material can inhibit, or prevent, voltage discharge, corona damage, voltage tracking, and/or other electrical problems from occurring between a high voltage source and the accelerometer 34.

The example base 16 also includes means for securing a mounting cap 42 of the assembly 10 to the base 16. The mounting cap 42, in turn, retains the probe housing 36 in place relative to the base 16. In one example, the mounting cap 42 can be generally cylindrical, though various geometries are contemplated.

Figure 2:
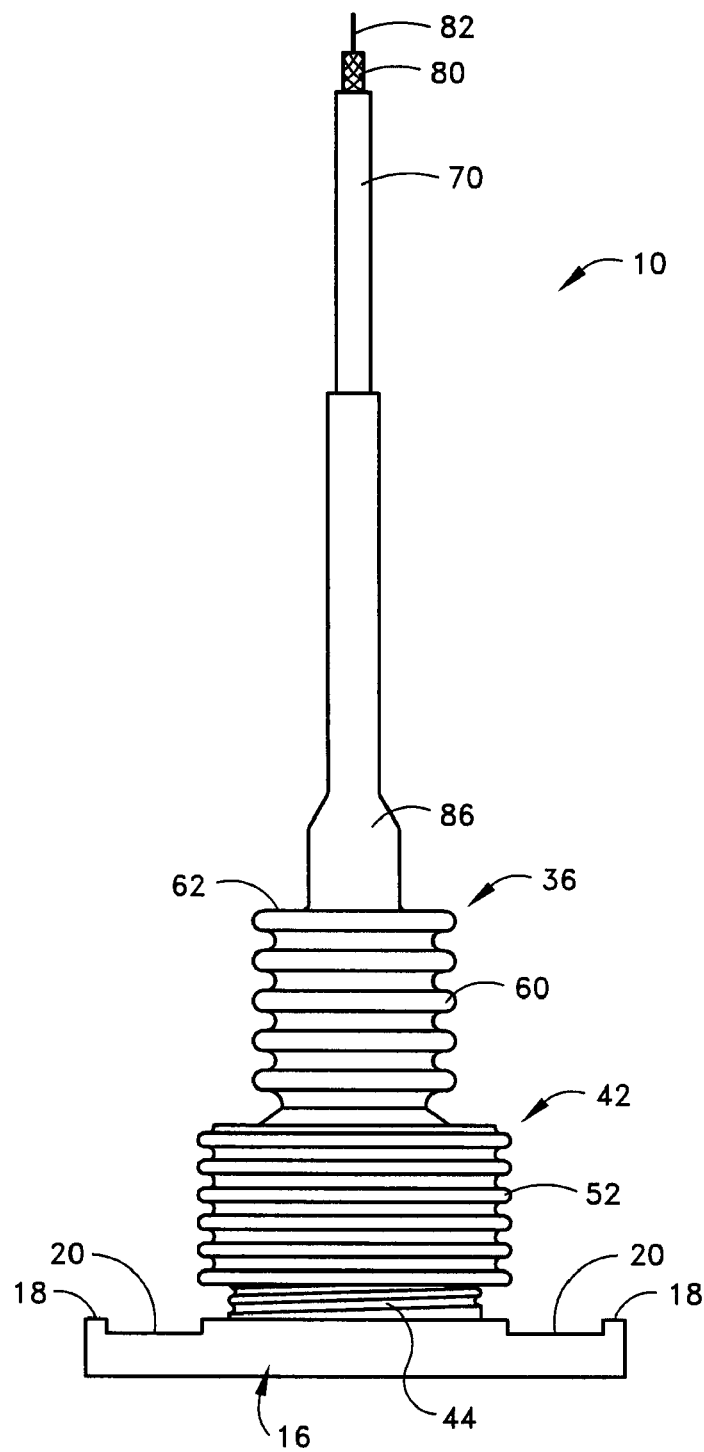
FIG. 2 illustrates a side view of the insulated accelerometer assembly and vibrated component of FIG. 1.

In the illustrated embodiment, an external male thread 44 is shown on an exterior surface of a portion of the base 16 that defines the recessed portion. The external male thread 44 engages a matching internal female thread 46 of the mounting cap 42. When threaded/screwed together, as shown in FIG. 2, the mounting cap 42 can form a secure fit with the base 16 to reduce vibration of the probe housing 36. A shoulder 48 of the probe housing 36 is held by the mounting cap 42 when the mounting cap is threaded/screwed to the base 16. The use of threaded engagement between the mounting cap 42 and the probe housing 36 allow for ease of disconnection of the mounting cap thus allowing convenient access to the accelerometer 34 within the probe housing.

Similar to the base 16, the mounting cap 42 can be made of an insulating material, such as glass filled plastic or the like, but can also be made of similar or different materials. The mounting cap 42 may be made of the same insulating material as the base 16. The insulating material can act to inhibit, or eliminate, various electrical problems, such as voltage discharge, corona damage, and/or voltage tracking. To further inhibit such problems, the mounting cap 42 may include one or more fins 52 on its surface. As shown, a plurality of fins 52 can extend generally around the exterior surface of the mounting cap 42, but some or all may only partially extend and may have various geometries. In one example, the series of fins 52 can be sinusoidally shaped in profile to increase the effective surface length taken vertically (i.e., from bottom to top) along the mounting cap 42 and to inhibit, or prevent, electrical tracking.

As mentioned, the probe housing 36 is secured in a fixed position when the mounting cap 42 is attached to the base 16. The probe housing can have a keyed geometric portion 54 for engaging with the recessed portion 30, which may also be keyed. The probe housing 36 can be cylindrical, though various other geometries are contemplated. As mentioned, the accelerometer 34 is located within the probe housing 36 and may be completely surrounded by the probe housing 36.

The probe housing 36 can reduce, such as minimizing or preventing, electrical problems such as voltage discharge, corona effect, and/or voltage tracking in a variety of manners. In one example, the probe housing 36 may be made of an insulating material, such as glass filled plastic or an alternative. The probe housing 36 may be made of the same insulating material as the base 16 and mounting cap 42. In addition or in the alternative, the probe housing 36 may be equipped with one or more fins 60 on its outer surface. The series of fins 60 can be sinusoidally shaped, extend at least partially around the outer perimeter of the probe housing 36, and disposed along a vertical length of the probe housing 36. As with the fins 52 on the mounting cap 42, the fins 60 on the probe housing 36 can reduce the presence of electrical tracking by increasing the effective vertical surface length of the probe housing 36.

Turning to the accelerometer 34 located within the probe housing 36, in one example the accelerometer is a Micro Electro Mechanical system, MEMs, capacitive integrated circuit. Since the assembly 10 is mounted on a vibrated component 12, which may include a stator end winding, the assembly 10 can be subject to magnetic fields. However, when mounted within the probe housing 36, the accelerometer 34 can be protected from, or generally immune to, the effects of various electrical problems. The insulating properties of probe housing 36, the presence of fins, and other features may each or collectively contribute to the reduced affects of voltage discharge, corona damage, and voltage tracking. Since the MEMs capacitive integrated circuit does not contain magnetic material, it is immune to electromagnetic influence.

It is to be appreciated that the accelerometer 34 is to be operatively connected to another component such that signals from the accelerometer are provided to the other component. As best seen in FIG. 1, an opening at a top 62 of the probe housing 36 enables a cable 70 to extend to the accelerometer 34 through the opening. The cable 70 provides the operative connection to the other component.

In one example, the cable 70 can include a dielectric material to reduce electrical discharge. In one embodiment, the cable 70 can be made of Santoprene rubber which has a relatively high dielectric property. However, various other thermoplastic elastomers may be substituted in order to reduce electrical discharge. With the cable 70 entering at the top of the probe housing 36, the cable and its point of entry are at maximum distances from the vibrated component 12. In one example, the distance between entrance location for the cable 70 at the top 62 of the probe housing 36 and the vibrated component 12 can be at least 3 inches. However, varying lengths are also contemplated. This distance, along with the cable material, provide for a high dielectric strength because an air gap between the cable's 70 entrance and the top of the probe housing 36 is formed, thus reducing the risk of an electrical discharge.

The cable 70 may also include a shield 80. The shield 80 may be braided and acts to reduce electrical noise. Furthermore, the shield 80 may be grounded at the far end of the cable. At least one electrically conductive wire 82 extends within the shield 80. In one example, multiple wires 82 are connected to the accelerometer 34 and thus multiple wires extend within the cable 70. For ease of discussion just a single wire is discussed below with the understanding that multiple wires may be present. As mentioned, the cable 70 is connected to another component. Thus, the wire 82 is operatively connected to the other component at the distal, opposite end from the accelerometer 34. As specific examples of the component connected at the distal end, the wire 82 may be connect to a controller, a sensor, or any similar apparatus.

The cable 70 may extend in tact from outside the assembly 10, through the probe housing 36, and towards the accelerometer 34. In one example, the exterior portion(s) of the cable 70 may not be stripped back until the cable 70 has entered the probe housing 36 to reduce, or eliminate, partial discharge with the exterior of the probe housing 36. The wire 82 is then electrically coupled to the accelerometer 34. As shown in FIG. 1, a wire 82 may be spliced for connecting to the accelerometer 34. In the alternative, more than one wire 82 may be housed within the cable 70.

The end of the cable 70 may also have a strain relief element 86 formed at least partially around the cable and adjacent to the top 62 of the probe housing 36. In one example, the strain relief element 86 may be a shrink tube material to support the cable connection to the probe housing 36. Furthermore, the strain relief element 86 may reduce weak spots in the cable 70 by partially covering the cable 70 in a spot where the cable 70 is likely to experience movement. By reducing weak spots, the strain relief element 86 can help the cable 70 to maintain its dielectric properties.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An insulated accelerometer assembly adapted for attachment to a vibrated component, the assembly including:
 a base having a portion for engagement with the vibrated component to couple the assembly to the vibrated component and to transmit vibration from the vibrated component to the assembly;
 an accelerometer disposed at least partially within the base;
 a housing at least partially enclosing the accelerometer and adapted to inhibit voltage discharge, corona damage, and voltage tracking on the accelerometer, the housing including an insulating material, having an interior with the accelerometer being disposed at least partially within the interior, and having an exterior that includes a plurality of sinusoidally-shaped raised fins non-engaged with other structures and providing increased effective surface length along the housing to inhibit electrical tracking;
 a mounting cap adapted to inhibit voltage discharge, corona damage, and voltage tracking on the accelerometer and having a portion engaged with the base to secure the housing relative to the base, the mounting cap including an electrically insulating material, and having an exterior that includes a plurality of sinusoidally-shaped raised fins non-engaged with other structures and providing increased effective surface length along the mounting cap to inhibit electrical tracking; and
 a cable having at least one electrically conductive wire and a shield to inhibit influence on the wire, the wire being operatively coupled to the accelerometer and extending within the shield.

2. The assembly of claim 1, wherein the housing includes a glass filled plastic.

3. The assembly of claim 1, wherein the mounting cap includes a glass filled plastic.

4. The assembly of claim 1, wherein the accelerometer is a Micro Electro-Mechanical system (MEMs) capacitive circuit.

5. The assembly of claim 1, wherein the cable includes a dielectric material.

6. The assembly of claim 5, wherein the dielectric material is Santoprene rubber.

7. The assembly of claim 1, further including a shrink tube material formed at least partially around the cable.

8. The assembly of claim 1, wherein the shield is braided.

9. The assembly of claim 1, wherein the vibrated component is a stator end winding of a generator.

10. The assembly of claim 1, wherein the base has a thread for engaging with the mounting cap.

11. The assembly of claim 1, wherein the mounting cap has a thread for engaging with the base.

12. The assembly of claim 1, wherein the housing has a keyed geometric portion for coupling with the base.

13. The assembly of claim 1, wherein the cable extends from the housing a distal location away from the vibrated component.

* * * * *